United States Patent
An

(10) Patent No.: US 11,620,996 B2
(45) Date of Patent: Apr. 4, 2023

(54) ELECTRONIC APPARATUS, AND METHOD OF CONTROLLING TO EXECUTE FUNCTION ACCORDING TO VOICE COMMAND THEREOF

(71) Applicant: Samsung Electronics Co., Ltd., Suwon-si (KR)

(72) Inventor: Jinwang An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 16/936,484

(22) Filed: Jul. 23, 2020

(65) Prior Publication Data

US 2021/0035575 A1 Feb. 4, 2021

(30) Foreign Application Priority Data

Aug. 1, 2019 (KR) .................. 10-2019-0093778

(51) Int. Cl.
*G10L 15/22* (2006.01)
*G10L 15/02* (2006.01)
*G10L 17/24* (2013.01)

(52) U.S. Cl.
CPC .............. *G10L 15/22* (2013.01); *G10L 15/02* (2013.01); *G10L 17/24* (2013.01); *G10L 2015/223* (2013.01); *G10L 2015/228* (2013.01)

(58) Field of Classification Search
CPC ........ G06F 40/30; G06F 3/167; G06F 40/247; G10L 15/22; G10L 2015/223; G10L 2015/228; G10L 15/1822; G10L 15/26; G10L 15/183
See application file for complete search history.

(56) References Cited

U.S. PATENT DOCUMENTS

| | | | |
|---|---|---|---|
| 2013/0290001 A1 | 10/2013 | Yun et al. | |
| 2014/0316768 A1* | 10/2014 | Khandekar | G06F 16/3329 704/9 |
| 2017/0242653 A1* | 8/2017 | Lang | H04L 12/2809 |
| 2018/0167516 A1* | 6/2018 | Warrick | G06F 3/167 |
| 2018/0285065 A1 | 10/2018 | Jeong | |
| 2018/0322870 A1* | 11/2018 | Lee | H04N 21/4394 |
| 2019/0095425 A1* | 3/2019 | Galitsky | G06F 40/295 |
| 2021/0035571 A1* | 2/2021 | Yun | G10L 15/22 |

FOREIGN PATENT DOCUMENTS

| | | |
|---|---|---|
| JP | 2001-221480 A | 8/2001 |
| JP | 2019-028388 A | 2/2019 |

* cited by examiner

*Primary Examiner* — Mark Villena
(74) *Attorney, Agent, or Firm* — Jefferson IP Law, LLP

(57) ABSTRACT

An electronic apparatus, and a method for the electronic apparatus to control to execute a function according to a voice command uttered by a user are provided. The electronic apparatus includes a memory including a plurality of databases divided according to predicates, a communication circuit that receives voice data corresponding to a voice command from an external apparatus, and a processor operatively connected with the memory and the communication circuit. The processor is configured to identify the type of a predicate included in the voice data, and based on information included in a database corresponding to the identified predicate, determine at least one apparatus to execute the voice command and a function that the at least one apparatus will perform according to the voice command, and control the at least one apparatus to execute the function according to the voice command.

18 Claims, 9 Drawing Sheets

FIG. 3

| | 301 | 302 | 303 | 304 | 305 |
|---|---|---|---|---|---|
| | ADJECTIVE | USER'S REQUEST | SUPPORTABLE EDGE | SUPPORTABLE THING | ACTION |
| 311 | COLD | RAISE THE INDOOR TEMPERATURE | NONE | AIR CONDITIONER | RAISE THE INDOOR TEMPERATURE BY TURNING OFF OR WEAKENING THE AIR CONDITIONER. |
| | HOT | LOWER THE INDOOR TEMPERATURE | NONE | AIR CONDITIONER | LOWER THE INDOOR TEMPERATURE BY TURNING UP THE AIR CONDITIONER TO HIGH. |
| | SULTRY | LOWER THE INDOOR TEMPERATURE AND LOWER THE HUMIDITY BY PERFORMING DEHUMIDIFICATION | NONE | AIR CONDITIONER, DEHUMIDIFIER | LOWER THE INDOOR TEMPERATURE BY TURNING UP THE AIR CONDITIONER TO HIGH. LOWER THE HUMIDITY BY OPERATING THE DEHUMIDIFIER. |
| | HAZY | WISH TO FRESHEN THE AIR | NONE | AIR PURIFIER | FRESHEN THE AIR BY OPERATING THE AIR PURIFIER AND TURNING ON THE OPTION OF USE OF A VIRUS DOCTOR. |
| 312 | NOISY | THE SOUND IS TOO LOUD. PLEASE LOWER THE SOUND. | TV, AUDIO EQUIPMENT | AIR CONDITIONER, DEHUMIDIFIER, AIR PURIFIER, WASHING MACHINE, DRYER | LOWER THE SOUND IN THE CASE OF A TV AND AN AUDIO EQUIPMENT. FOR THE AIR CONDITIONER, DEHUMIDIFIER, AIR PURIFIER, WASHING MACHINE, AND DRYER, LOWER THE SOUND IN THE SETTING OR AUTOMATICALLY SET IN A GROUP. |

FIG. 4

| VERB | MAIN APPARATUS (SUBJECT) | ACTION SUBJECT (OBJECT) |
|---|---|---|
| PLEASE CLEAN UP | ROBOT CLEANER | DUST ON THE FLOOR |
| PLEASE LOWER | AIR CONDITIONER, REFRIGERATOR, TV | INDOOR TEMPERATURE IN THE CASE OF AIR CONDITIONER COLD STORAGE/FREEZER TEMPERATURE IN THE CASE OF REFRIGERATOR SOUND IN THE CASE OF TV |
| PLEASE WASH | WASHING MACHINE | WASHING OR LAUNDRY |
| PLEASE TURN ON | AIR CONDITIONER, TV, WASHING MACHINE, ROBOT CLEANER, AIR PURIFIER | POWER |
| PLEASE MAKE IT QUIET | AIR CONDITIONER, TV, WASHING MACHINE, ROBOT CLEANER, AIR PURIFIER | SOUND |

FIG. 5

| MACRO NAME (501) | PROCESSED VOICE DATA (502) |
|---|---|
| I'LL GO OUT | PLEASE TURN OFF THE POWERS OF ALL ELECTRONIC PRODUCTS |
| I'M BACK | PLEASE SET THE CURRENT TEMPERATURE OF THE AIR CONDITIONER TO 26 DEGREES AND TURN ON THE TV |
| GOOD NIGHT, BIXBY | PLEASE SET A RESERVATION OF 1 HOUR FOR THE AIR CONDITIONER, AND SET THE VOLUME OF THE TV TO 8 AND TURN IT OFF AFTER ONE HOUR. PLEASE SET THE ALARM AT 7 ON WEEKDAYS |
| HI, BIXBY | PLEASE LET ME KNOW TODAY'S NEWS AND WEATHER. PLEASE OPERATE THE AIR PURIFIER FOR TWO HOURS. PLEASE SET THE TEMPERATURE OF THE AIR CONDITIONER TO 27 DEGREES. |

ELECTRONIC APPARATUS, AND METHOD OF CONTROLLING TO EXECUTE FUNCTION ACCORDING TO VOICE COMMAND THEREOF

CROSS-REFERENCE TO RELATED APPLICATION(S)

This application is based on and claims priority under 35 U.S.C. § 119(a) of a Korean patent application number 10-2019-0093778, filed on Aug. 1, 2019, in the Korean Intellectual Property Office, the disclosure of which is incorporated by reference herein in its entirety.

BACKGROUND

1. Field

The disclosure relates to an electronic apparatus, and a method for the electronic apparatus to control at least one apparatus to execute a function according to a voice command uttered by a user.

2. Description of Related Art

Use of electronic apparatuses which recognize voice commands uttered by users is gradually increasing. Electronic apparatuses recognizing voice commands are being actively used not only in personal computers (PCs) and mobile communication apparatuses, but also in home appliances such as digital televisions (TVs), air conditioners, and home theaters.

In order for an electronic apparatus to recognize a voice command correctly, a user needs to utter a voice command clearly. For example, in case a voice command of a user clearly describes an electronic apparatus that the user wants to execute, the action that the electronic apparatus will execute, and the subject of execution of the electronic apparatus, the electronic apparatus can recognize the voice command of the user better, and perform a function according to the voice command.

Meanwhile, in order to pre-process a voice command as voice data, and analyze the pre-processed voice data as a process for recognizing a voice command, a large amount of resources may be required. Accordingly, a method of recognizing a voice by transmitting voice data to a server, or a method of recognizing a voice by distributing some of a voice recognition process with another apparatus is being considered.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for executing a function of an electronic apparatus according to a voice command, and is aimed at recognizing a voice command uttered by a user well and determining a function that an electronic apparatus will perform according to the voice command. Also, the disclosure is aimed at recognizing a voice command uttered by a user more swiftly and correctly by utilizing resources of each electronic apparatus communicatively connected.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a memory including a plurality of databases divided according to predicates, a communication circuit configured to receive voice data corresponding to a voice command from an external apparatus, and a processor operatively connected with the memory and the communication circuit. The processor is configured to identify a type of a predicate included in the voice data, and based on information included in a database corresponding to the identified predicate, determine at least one apparatus to execute the voice command and a function that the at least one apparatus will perform according to the voice command, and control the at least one apparatus to execute the function according to the voice command.

In accordance with another aspect of the disclosure, a method of controlling an electronic apparatus is provided. The method includes receiving voice data corresponding to a voice command, identifying the type of a predicate included in the voice data, based on information included in a database corresponding to the predicate, determining at least one apparatus to execute the voice command and a function that the at least one apparatus will perform according to the voice command, and controlling the at least one apparatus to execute the function according to the voice command.

According to the disclosure, a user can execute a function of an electronic apparatus with a voice command like conversing in a general colloquial style, without uttering a correct voice command.

For example, when a user wants to execute a function of a robot cleaner, the user can execute the function of the robot cleaner by uttering simply as "Please clean up" while omitting the subject, instead of uttering "Robot cleaner. Please clean up." Alternatively, a user can execute a function of a robot cleaner by uttering "It's dirty" by using an adjective.

As another example, when a user wants to execute a function of an air conditioner, the user can execute the function of the air conditioner by uttering "It's cold" by using an adjective, instead of uttering "Air conditioner. Please raise the temperature of the room."

According to the disclosure, even if a user utters a voice command while omitting some of predicates, an electronic apparatus can provide correct voice recognition by assuming the omitted predicates from information included in a database. In particular, in case there are several main subjects that will perform a function, an electronic apparatus can control a specific apparatus reflecting a user's intention to perform a function according to a voice command.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating predicate databases according to an embodiment of the disclosure;

FIG. 4 is a diagram illustrating predicate databases according to an embodiment of the disclosure;

FIG. 5 is a diagram illustrating a macro database according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, each of the phrases "A or B," "at least one of A and B," "at least one of A or B," "A, B or C," "at least one of A, B and C," "A and/or B" and "at least one of A, B or C" may include any one of the items listed together with the phrase among the above phrases, or all possible combinations thereof. Also, terms such as "the first," "the second" and "the first" and "the second" may be used just to distinguish one element from another element, and do not limit the elements in other aspects (e.g.: importance or order). In addition, in case it is mentioned that one (e.g.: the first) element is "coupled" or "connected" with another (e.g.: the second) element together with the terms "operatively" or "communicatively," or without such terms, it means that the one element may be connected with the another element directly (e.g.: via wire), wirelessly, or through a third element.

In the disclosure, a predicate is a word describing a movement, a state, and a property, and may include verbs and adjectives. A verb may be a word expressing a movement or a process of a person or an object, and an adjective may be a word expressing a state or a property of a person or an object. Also, in the disclosure, a morpheme is a unit of a language having meaning, and may further include a noun that can be an object or a subject, in addition to a verb and an adjective that can be the aforementioned predicate.

Hereinafter, preferred embodiments of the disclosure will be described in detail with reference to the accompanying drawings.

Figure 1:
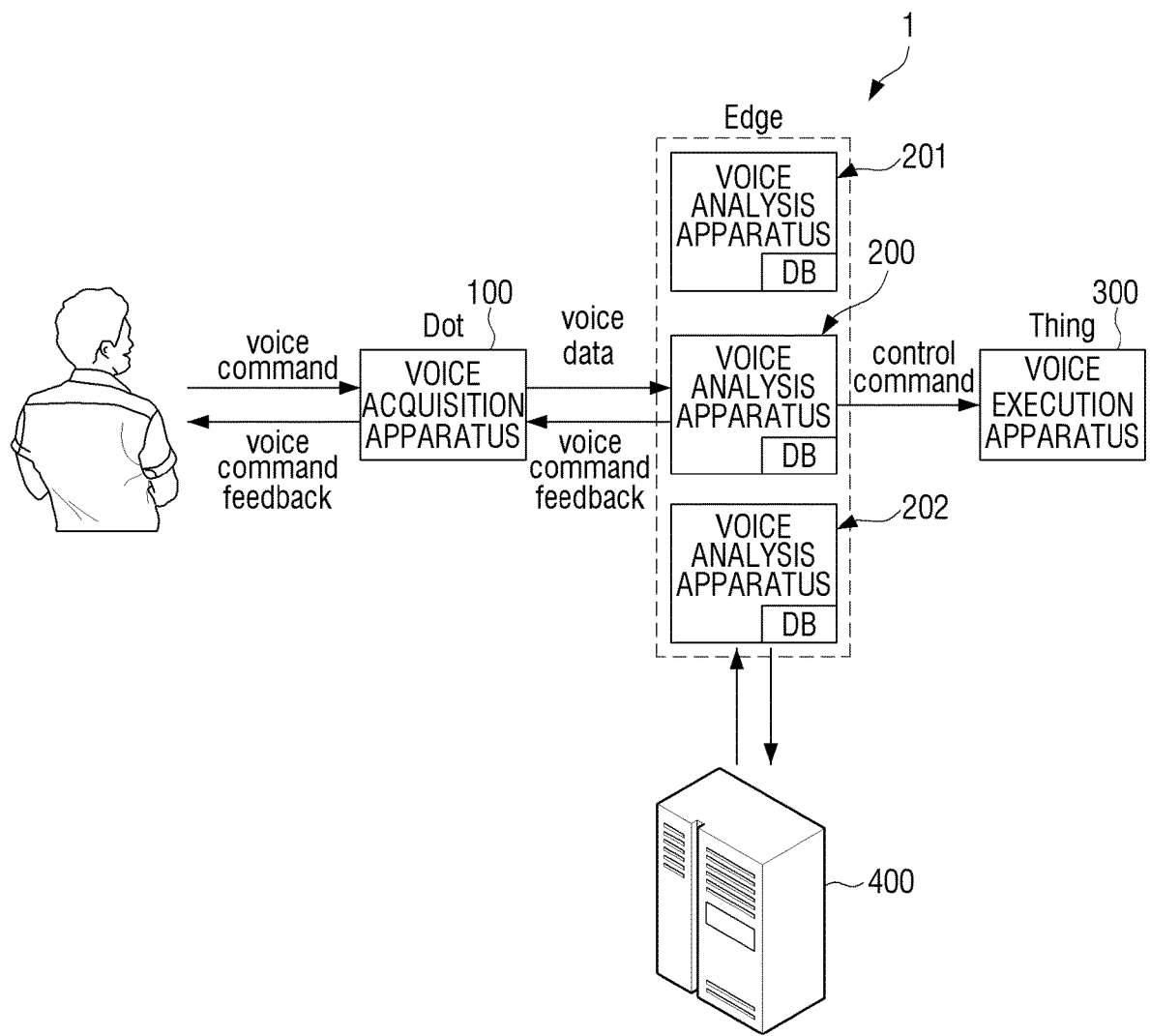
FIG. 1 is a diagram illustrating a voice recognition system according to an embodiment of the disclosure.

FIG. 1 illustrates a voice recognition system according to an embodiment of the disclosure.

Referring to FIG. 1, the voice recognition system 1 may include a voice acquisition apparatus (or, a dot apparatus) 100, voice analysis apparatuses (or, edge apparatuses) 200, 201, 202, and a voice execution apparatus (or, a voice command execution apparatus, a thing apparatus) 300.

The voice acquisition apparatus 100, the voice analysis apparatuses 200, and the voice execution apparatus 300 may be various types of electronic apparatuses. The various types of electronic apparatuses may include a portable electronic apparatus like a smartphone, a computer apparatus, a portable multimedia apparatus, a portable medical apparatus, a camera, a wearable apparatus, or a home appliance, but are not limited to the aforementioned apparatuses.

Meanwhile, names of apparatuses such as the voice acquisition apparatus 100, the voice analysis apparatuses 200, and the voice execution apparatus 300 are terms defined from one function among several functions performed at each apparatus for the convenience of explanation, and depending on embodiments, the voice acquisition apparatus 100 may perform a voice analysis function and/or a voice execution function, and the voice analysis apparatus 200 may perform a voice pre-processing function and/or a voice execution function, and the voice execution apparatus 300 may perform a voice pre-processing function and/or a voice execution function. As an example, the voice analysis apparatus 200 may have more abundant resources than the voice acquisition apparatus 100 and/or the voice execution apparatus 300 for voice analysis. For example, the voice analysis apparatus 200 may include a rule-based model and/or an artificial neural network-based model necessary for voice recognition. As neural networks that are used in processes of generating, updating, or inferring an artificial neural network model, there may be a convolutional neural network (CNN), a deep neural network (DNN), a recurrent neural network (RNN), a restricted Boltzmann machine (RBM), a deep belief network (DBN), a bidirectional recurrent deep neural network (BRDNN), or deep Q-networks, but the disclosure is not limited to the aforementioned examples. Such an artificial neural network model may be stored in the memory of the voice analysis apparatus 200 or an external apparatus that can communicate with the voice analysis apparatus 200 in the form of software, or it may be integrated as an on-device artificial intelligence chip and become a part of the processor of the voice analysis apparatus 200.

The voice acquisition apparatus 100 may receive input of a voice command uttered by a user and convert the command into an electronic voice signal. For this, the voice acquisition apparatus 100 may include a microphone. The converted voice signal has a form of an audio waveform in a state of pulse code modulation (PCM) or in a compressed form. The voice acquisition apparatus 100 may further include an A/D converter converting a voice signal of a user into a digital signal. Meanwhile, in case the voice acquisition apparatus 100 includes a digital microphone, the voice acquisition apparatus 100 may not include a separate A/D converter. According to the various embodiments of the disclosure, the voice acquisition apparatus 100 may be a microphone transmitter, a remote controller, a mobile phone, etc., but is not limited to the aforementioned examples.

The voice acquisition apparatus 100 may perform a voice pre-processing function. For example, the voice acquisition apparatus 100 may divide voice data converted into digital data into syntactic units (e.g.: words, phrases, morphemes, etc.) by using a natural language understanding module, and identify which syntactic elements the divided units have. According to the various embodiments of the disclosure, the voice pre-processing function of the voice acquisition apparatus 100 may be performed in at least one of the plurality of voice analysis apparatuses 200, 201, 202.

When voice data is distinguished according to syntactic elements, the voice acquisition apparatus 100 may transmit the pre-processed voice data having syntactic elements to at least one of the plurality of voice analysis apparatuses 200, 201, 202. In this case, the voice acquisition apparatus 100 may select at least one voice analysis apparatus to transmit the pre-processed voice data among the plurality of voice analysis apparatuses 200, 201, 202 based on a specific condition. For example, the voice acquisition apparatus 100 may preferentially select a voice analysis apparatus which is the closest in terms of distance, which has the best communication state, which has a preset communication channel formed, or which was set in advance as a subject for voice analysis by a user or a manufacturer among the plurality of voice analysis apparatuses 200, 201, 202. In the disclosure, it will be assumed that one voice analysis apparatus 200 was selected among the plurality of voice analysis apparatuses 200, 201, 202, for the convenience of explanation.

The voice analysis apparatus 200 which received the pre-processed voice data having syntactic elements may analyze the acquired voice data and determine a service corresponding to the voice command uttered by the user.

According to the various embodiments of the disclosure, the voice analysis apparatus 200 may perform a pre-processing function for the voice data acquired from the voice acquisition apparatus 100, and analyze the pre-processed voice data having syntactic elements, and determine a service corresponding to the voice command uttered by the user.

Also, according to the various embodiments of the disclosure, the voice analysis apparatus 200 may determine whether to analyze its own voice data in consideration of its resource state. For example, the voice analysis apparatus 200 may determine whether its resource state is appropriate for analyzing voice data, in consideration of whether voice data can be analyzed, the time spent for analysis of voice data, etc. In case its resource state is not appropriate for analyzing voice data, the voice analysis apparatus 200 may transmit the voice data acquired from the voice acquisition apparatus 100 to at least one of the other voice analysis apparatuses 201, 202, and control the at least one voice analysis apparatus that received the voice data to analyze the voice data.

In case the voice analysis apparatus 200 performs analysis of voice data, the voice analysis apparatus 200 may identify the type of the predicate included in the voice data, and acquire information included in a database (DB) corresponding to the identified predicate.

The voice analysis apparatus 200 may include a memory including at least one database necessary for voice analysis. The at least one database may be divided, for example, according to predicates. For example, the at least one database may include at least one of an adjective database, a verb database, or a macro database. Specific examples of an adjective database, a verb database, and a macro database will be described in detail later.

According to an embodiment of the disclosure, each of the plurality of voice analysis apparatuses 200, 201, 202 may include all of an adjective database, a verb database, and a macro database, or each of the plurality of voice analysis apparatuses 200, 201, 202 may include at least one of an adjective database, a verb database, or a macro database in a distributive way. For example, the first voice analysis apparatus 200 may include an adjective database, the second voice analysis apparatus 201 may include a verb database, and the third voice analysis apparatus 202 may include a macro database, respectively.

According to the various embodiments of the disclosure, in case information corresponding to a predicate included in voice data does not exist in a database, the voice analysis apparatus 200 may transmit the predicate included in the voice data to an external server 400. The external server 400 may search information corresponding to the received predicate from the databases for each predicate stored in the external server 400. Then, the external server 400 may transmit the searched information corresponding to the predicate to the voice analysis apparatus 200. The external server 400 may include, for example, a cloud server. In general, a cloud server may be used by a storing method of registering data by using a software environment without being restricted by fixed hardware like a cloud floating in an Internet environment, and using the registered data. There may be various types of services by a cloud. For example, according to the characteristics of services, services may be divided as Software as a Service (SaaS), Platform as a Service (PaaS), Hardware as a Service (HaaS), Infrastructure as a Service (IaaS), etc., but the services are identical in terms of their concepts, and are just slightly different according to the manufacturers.

The voice analysis apparatus 200 may determine at least one apparatus to execute a voice command and the function that the at least one apparatus will perform according to the voice command, based on information searched from the database of the voice analysis apparatus 200 or information received from an external server. For example, the voice analysis apparatus 200 may determine the voice analysis apparatus 200 itself as an apparatus to execute a voice command, or determine the voice execution apparatus 300 as an apparatus to execute a voice command, based on information regarding an apparatus corresponding to a predicate included in the database.

According to the various embodiments of the disclosure, in case information corresponding to an identified predicate does not exist in a database, the voice analysis apparatus 200 may transmit voice data to at least one of the other voice analysis apparatuses 201, 202, and control the at least one voice analysis apparatus that received the voice data to analyze the voice data. Alternatively, in case information corresponding to an identified predicate does not exist in a database, the voice analysis apparatus 200 may update the database. For example, the voice analysis apparatus 200 may request and acquire information included in databases to the other voice analysis apparatuses 201, 202, and update the database of the voice analysis apparatus 200. That is, the voice analysis apparatus 200 may synchronize its database with the databases of the other voice analysis apparatuses 201, 202.

When at least one apparatus to execute a voice command and the function that the at least one apparatus will perform according to the voice command are determined, the voice analysis apparatus 200 may control the at least one apparatus that will execute the voice command to execute the function according to the voice command. As an example, in case the voice analysis apparatus 200 itself is determined as an apparatus to execute a voice command, the voice analysis apparatus 200 may execute a function according to the voice command, based on information regarding an action corresponding to a predicate included in the database. As another example, in case the apparatus to execute the voice command is identified as the voice execution apparatus 300, the voice analysis apparatus 200 may transmit information regarding an action acquired from the database to the voice execution apparatus 300.

When a function according to a voice command is executed at the voice analysis apparatus 200 or the voice execution apparatus 300, the voice analysis apparatus 200 or the voice execution apparatus 300 may provide a voice command feedback indicating that a function according to a voice command has been executed or is being executed to the user. For example, the voice analysis apparatus 200 or the voice execution apparatus 300 may transmit information on a voice command feedback to the voice acquisition apparatus 100. Based on the information on the voice command feedback, the voice acquisition apparatus 100 may provide the voice command feedback to the user. The voice command feedback may be, for example, a visual feedback, an auditory feedback, or a tactile feedback.

A user may provide a user feedback in response to a voice command feedback. A user may provide a user feedback as a voice command, or provide a user feedback through a screen provided by the voice acquisition apparatus 100 or the voice analysis apparatus 200. The voice analysis apparatus 200 may update a plurality of databases divided according to predicates, based on information on the provided user feedback.

Figure 2:
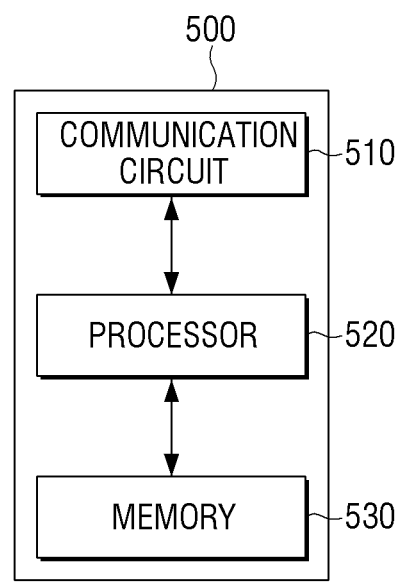
FIG. 2 is a block diagram of an electronic apparatus according to an embodiment of the disclosure.

FIG. 2 is a block diagram of an electronic apparatus according to an embodiment of the disclosure.

Referring to FIG. 2, the components of the electronic apparatus 500 may correspond to the components of the voice acquisition apparatus 100, the voice analysis apparatus 200, or the voice execution apparatus 300, but in the disclosure, explanation will be made mainly focused on the voice analysis apparatus 200.

The electronic apparatus 500 may include a communication circuit 510, a processor 520, and a memory 530. Also, the electronic apparatus 500 may include at least some of the components and/or functions of the electronic apparatus 900 in FIG. 9 that will be described later.

The communication circuit 510 may include a wired communication module and/or a wireless communication module for supporting communication in various ways. Also, the communication circuit 510 may include at least some of the components and/or functions of the communication module 990 in FIG. 9 that will be described later. In addition, the communication circuit 510 may receive voice data from an external apparatus (e.g., the voice acquisition apparatus 100 in FIG. 1) by control of the processor 520, and transmit the voice data to the processor 520. Further, the communication circuit 510 may transmit information to an external server or another electronic apparatus (e.g., the voice analysis apparatuses 201, 202 in FIG. 1) by control of the processor 520. For example, the communication circuit 510 may transmit information on voice data and a database to an external server or another electronic apparatus.

The memory 530 may include a volatile memory and/or a non-volatile memory. Also, the memory 530 may include at least some of the components and/or functions of the memory 530 in FIG. 9 that will be described later. The memory 530 may be operatively and/or electrically connected with the processor 520, and store various instructions that can be performed at the processor 520. Such instructions may include control commands such as arithmetic and logical operations, data movement, input and output, etc. that can be recognized by the processor 520. Also, the memory 530 may store databases. The databases are databases divided for each predicate, and may include a verb database and/or an adjective database. Also, the databases may include a macro database.

The processor 520 is a component that can perform control of each component of the electronic apparatus 500 and/or operations or data processing regarding communication, and may include at least some of the components and/or functions of the processor 520 in FIG. 9 that will be described later. The processor 520 may be operatively and/or electrically connected with the internal components of the electronic apparatus 500 such as the communication circuit 510 and the memory 530.

There may be no limitation on operation and data processing functions that the processor 520 can implement inside the electronic apparatus 500, but in the disclosure, the processor 520 may perform the embodiments that will described below by loading instructions stored in the memory 530.

According to the various embodiments of the disclosure, when voice data corresponding to a voice command is received from an external apparatus (e.g.: the voice acquisition apparatus 100 in FIG. 1), the processor 520 may identify the type of the predicate included in the received voice data. Here, in case the voice command was set as a macro in advance, the processor 520 may acquire processed voice data corresponding to the preset macro, and identify the type of the predicate included in the processed voice data.

The processor 520 may select a database corresponding to the identified predicate among the plurality of databases stored in the memory 530.

Also, the processor 520 may determine at least one apparatus that will execute a voice command and the function that the at least one apparatus will perform according to the voice command, based on information included in the database corresponding to the identified predicate stored in the memory 530. Here, if there are a plurality of apparatuses to execute the voice command, the processor 520 may request user identification for an apparatus that will actually execute the function according to the voice command among the plurality of apparatuses. For example, the processor 520 may control the communication circuit 510 to transmit information on the plurality of apparatuses and the functions that the plurality of apparatuses will perform to an external apparatus (e.g.: the voice acquisition apparatus 100 in FIG. 1), and control the communication circuit 510 to receive information on the apparatus that the user selected among the plurality of apparatuses from the external apparatus.

According to the various embodiments of the disclosure, in case information corresponding to a predicate does not exist in the plurality of databases, the processor 520 may transmit the predicate to an external server (e.g.: the external server 400 in FIG. 1), and control the communication circuit 510 to receive information corresponding to the predicate from the external server.

When at least one apparatus and a function are determined, the processor 520 may control the at least one apparatus to execute the function according to the voice command. For example, as the at least one apparatus is determined as the electronic apparatus 500 based on information included in the database stored in the memory 530, the processor 520 may execute the function according to the voice command. As another example, as the at least one apparatus is determined as a third apparatus (e.g.: the voice execution apparatus 300 in FIG. 1) based on information included in the database stored in the memory 530, the processor 520 may control the communication circuit 510 to transmit information on the function according to the voice command to the third apparatus.

According to the various embodiments of the disclosure, in case information on a user feedback is acquired regarding a function according to a voice command, the processor 520 may update the plurality of databases divided according to predicates based on the information on the user feedback.

FIGS. 3 and 4 are diagrams illustrating predicate databases according to various embodiments of the disclosure.

Referring to FIGS. 3 and 4, the predicate databases may be included in the memory 530 in FIG. 2. Alternatively, the predicate databases may be stored in the memory of an external apparatus that can communicate with the electronic apparatus 500. As predicate databases, there may be at least one of an adjective database or a verb database, for example. In case the electronic apparatus 500 receives pre-processed voice data having syntactic elements, the electronic apparatus 500 may identify the types of predicates as syntactic elements included in the voice data. For example, the electronic apparatus 500 may identify whether a predicate included in the voice data includes a verb or an adjective. When the type of the predicate is identified, the electronic apparatus 500 may select a database corresponding to the identified predicate among the plurality of databases included in the memory 450. Then, the electronic apparatus 500 may acquire information on the apparatus that will execute the user's voice command and information on the action from the selected database.

As an example of such databases, the adjective database in FIG. 3 may include at least one of a user's request field 302 corresponding to the adjective, a supportable edge apparatus field 303 corresponding to the adjective, a supportable thing apparatus field 304 corresponding to the adjective, or an action field 305 corresponding to the adjective, based on the adjective field 301.

For example, in 311 in FIG. 3, in case the adjective is 'cold,' a user's request corresponding to 'cold' may be 'Raise the indoor temperature.' Also, there may be no edge apparatus corresponding to 'cold,' and a thing apparatus corresponding to 'cold' may be 'an air conditioner.' In addition, an action regarding 'an air conditioner' may be raising the indoor temperature by turning off or weakening 'an air conditioner.'

As another example, in 312 in FIG. 3, in case the adjective is 'noisy,' a user's request corresponding to 'noisy' may be 'The sound is too loud. Please lower the sound.' Also, an edge apparatus corresponding to 'noisy' may include 'a TV' and 'an audio equipment,' and a thing apparatus corresponding to 'noisy' may include 'an air conditioner,' 'a dehumidifier,' 'an air purifier,' 'a washing machine,' and 'a dryer.' In addition, an action regarding 'a TV' and 'an audio equipment' may be lowering the sound, and actions regarding 'an air conditioner,' 'a dehumidifier,' 'an air purifier,' 'a washing machine,' and 'a dryer' may be adjusting the setting of operation modes of each of them, or grouping and adjusting the setting of the operation modes at once, so that the sound is lowered.

The actions in FIG. 3 were described in a natural language for promoting understanding of the disclosure, but actions may include instructions necessary for performing functions. For example, the action in 311 in FIG. 3 may include instructions such as turning-off 'an air conditioner,' lowering the temperature of 'an air conditioner,' and maintaining 'an air conditioner' to a specific temperature, etc.

As another example of a predicate database, the verb database in FIG. 4 may include at least one of a user's request field 402 corresponding to the verb, a main apparatus (or, a subject) field 402 corresponding to the verb, or an action subject (or, an object) field 403 corresponding to the verb, based on the verb field 401. Here, the main apparatus is an apparatus executing a function according to a voice command, and may include, for example, an edge apparatus (or, a voice analysis apparatus) 200 and a thing apparatus (or, a voice execution apparatus) 300. Also, an action subject may include a target object of a function performed at the electronic apparatus 500 in response to the verb.

For example, in 411 in FIG. 4, in case the verb is 'please clean up,' the main apparatus executing a function corresponding to 'please clean up' may be 'a robot cleaner,' and the action subject corresponding to the verb may be 'the dust on the floor.'

As another example, in 412 in FIG. 4, in case the verb is 'please make it quiet,' the main apparatus executing a function corresponding to 'please make it quiet' may be 'an air conditioner,' 'a TV,' 'washing machine,' 'a robot cleaner,' and 'an air purifier.' Also, the action subject corresponding to the verb may be 'a sound.'

According to the various embodiments of the disclosure, information included in a predicate database may be generated, added, or updated based on a user's voice command. For example, the electronic apparatus 500 may identify syntactic elements of voice data included in a user's voice command. As an example, the electronic apparatus 500 may identify whether the voice data includes at least one of a subject, a verb, an adjective, or an object. When syntactic elements of the voice data are identified, the electronic apparatus 500 may record the identified subject, verb, adjective, or object in a verb database or an adjective database.

For example, the electronic apparatus 500 may record an identified adjective in the adjective field 301 of the adjective database in FIG. 3, and record a subject in the supportable edge apparatus field 303 or the supportable thing apparatus field 304 of the adjective database, and record a verb and an object in the action field 305. As another example, the electronic apparatus 500 may record an identified verb in the verb field 401 in the verb database in FIG. 4, record a subject in the main apparatus field 402 in the verb database, and record an object in the action subject field 403.

According to the various embodiments of the disclosure, the electronic apparatus 500 may share a predicate database with another apparatus. For example, information included in the predicate database of the first voice analysis apparatus 200 may be transmitted to the predicate database of the second voice analysis apparatus 201 and the predicate database of the third voice analysis apparatus 202. On the contrary, information included in the predicate database of the second voice analysis apparatus 201 and the predicate database of the third voice analysis apparatus 202 may be transmitted to the predicate database of the first voice analysis apparatus 200.

The electronic apparatus 500 may periodically share a predicate database with another apparatus, or share a predicate database when an event occurs. For example, in case an event of a user's update request occurs, or the database of the electronic apparatus 500 is updated according to a preset user feedback, the electronic apparatus 500 may share a predicate database with another apparatus.

FIG. 5 is a diagram illustrating a macro database according to an embodiment of the disclosure.

Referring to FIG. 5, the macro database may include a preset macro name field 501, and a processed voice data field 502 corresponding to the macro name For example, in 501 in FIG. 5, in case the macro name is 'I'll go out,' the processed voice data corresponding to the macro name may be 'please turn off the powers of all electronic products.' As another example, in 502 in FIG. 5, in case the macro name is 'Hi, Bixby,' the processed voice data corresponding to the macro name may be 'Please let me know today's news and weather. Please operate the air purifier for two hours, and set the temperature of the air conditioner to 27 degrees.'

Setting of processed voice data corresponding to a macro name as above may be set by a user, or set in advance as default information by the manufacturer of the electronic apparatus 500, the provider of the application installed on the electronic apparatus 500, or the provider of the operating system. As an example, the electronic apparatus 500 may set a macro name in consideration of the pattern of a sentence that a user utters. For example, a user may set a macro name in a conditional sentence pattern. As an example, a user may utter in a conditional sentence pattern like "Bixby! From now on, 'please turn off the powers of all electronic products' when I say 'I'll go out'". In this case, the electronic apparatus 500 may determine a macro name and processed voice data to be performed according to the macro name from the voice command uttered by the user.

For example, as in 511 in FIG. 5, the electronic apparatus 500 may set 'I'll go out' which is voice data corresponding to a voice command as a macro name, and set 'please turn off the powers of all electronic products' as processed voice data corresponding to the macro name.

In this case, in case the user utters 'I'll go out,' the electronic apparatus 500 may identify whether a macro name corresponding to the uttered voice command exists in the macro database, and in case a macro name corresponding to the voice command exists, the electronic apparatus 500 may acquire 'please turn off the powers of all electronic products' which is processed voice data corresponding to the macro name. Then, the electronic apparatus 500 may identify the type of the predicate in the acquired processed voice data, and determine at least one apparatus to execute the entire voice command, and the function that the at least one apparatus will perform, based on information included in the database corresponding to the predicate. Then, the electronic apparatus 500 may control the at least one apparatus to execute the function according to the entire voice command.

Figure 6:
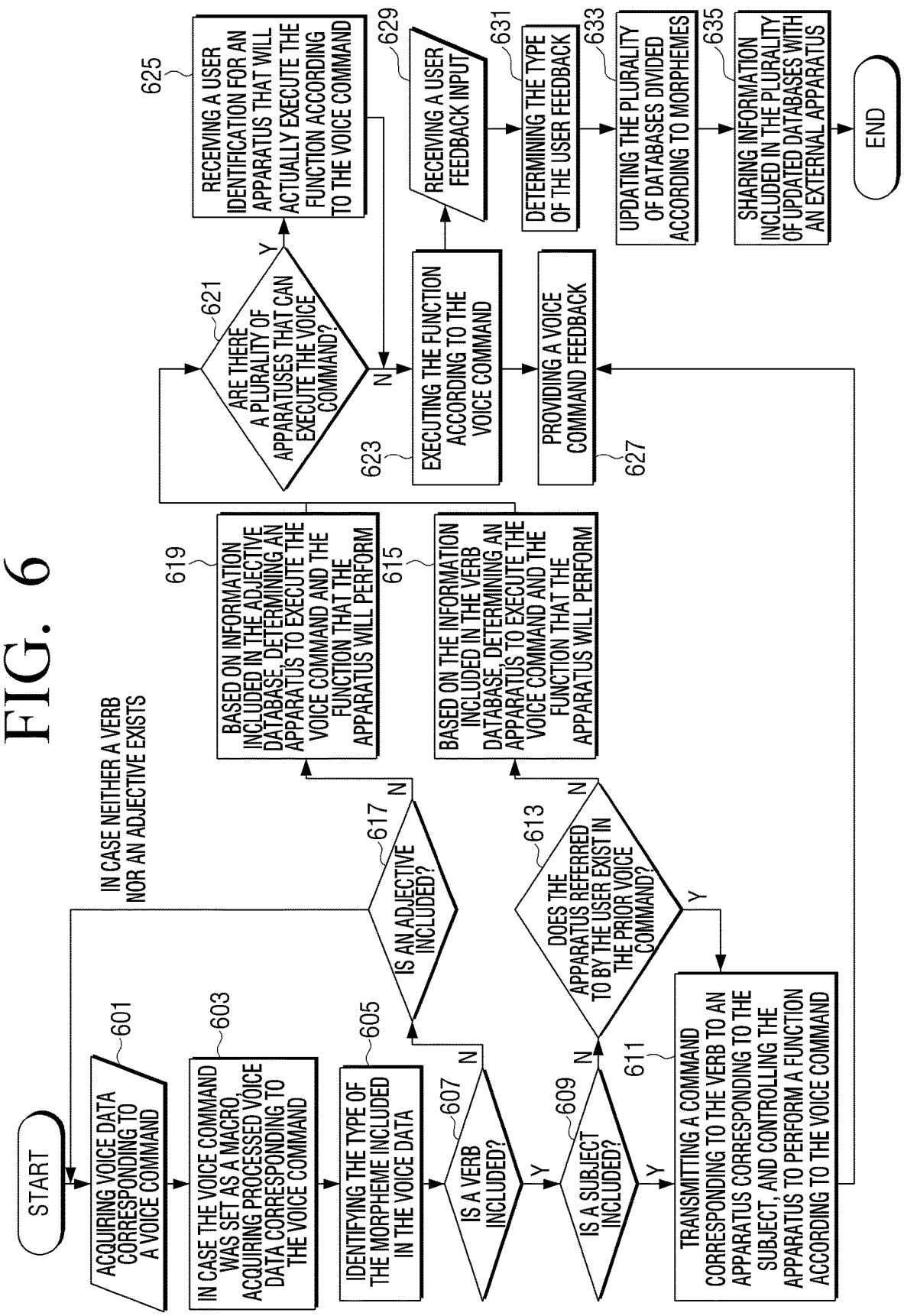
FIG. 6 is a flow chart of an electronic apparatus according to an embodiment of the disclosure.

FIG. 6 is a flow chart of an electronic apparatus according to an embodiment of the disclosure.

Referring to FIG. 6, first, at operation 601, the electronic apparatus 500 may acquire voice data corresponding to a voice command uttered by a user from an external apparatus (e.g.: a dot apparatus).

At operation 603, the electronic apparatus 500 that acquired the voice data may analyze the voice data, and in case the voice command uttered by the user was set as a macro in advance, the electronic apparatus 500 may search processed voice data corresponding to the preset macro in the macro database, and acquire processed voice data corresponding to the voice command. In case the voice command uttered by the user was not set as a macro in advance, the operation 603 may be omitted.

At operation 605, the electronic apparatus 500 that acquired the voice data may identify the type of the predicate included in the voice data.

At operation 607, the electronic apparatus 500 may determine whether a verb is included in the voice data.

In case a verb is included, at operation 609, the electronic apparatus 500 may determine whether a subject is included in the voice data.

In case a verb and a subject are included in the voice data, at operation 611, the electronic apparatus 500 may transmit a command corresponding to the verb to an apparatus corresponding to the subject (e.g.: the edge apparatus or the thing apparatus), and control the apparatus to perform a function according to the voice command.

In contrast, in case a verb exists but a subject does not exist as a result of determination at the operation 609, at operation 613, the electronic apparatus 500 may analyze the voice command prior to the voice command uttered by the user, and determine whether the apparatus referred to by the user (e.g.: the edge apparatus or the thing apparatus) exists in the prior voice command.

In case the apparatus referred to by the user (e.g.: the edge apparatus or the thing apparatus) exists in the prior voice command, the electronic apparatus 500 may transmit a command corresponding to the verb to the apparatus corresponding to the subject referred to by the user, and control the apparatus to perform the function according to the voice command, as in the aforementioned operation 611.

In contrast, in case the apparatus referred to by the user does not exist in the prior voice command as a result of determination at the operation 613, at operation 615, the electronic apparatus 500 may determine an apparatus to execute the voice command and the function that the apparatus will perform according to the voice command, based on information regarding the main apparatus (e.g.: the edge apparatus or the thing apparatus) corresponding to the verb and the action subject, as information included in the verb database. Here, in case there is no information corresponding to the verb in the verb database, the electronic apparatus 500 may transmit the identified verb or the voice data acquired at the operation 601 to an external server, and in response thereto, receive information on the apparatus that will execute the voice command and the function that the apparatus will perform according to the voice command.

Meanwhile, at the operation 607, in case a verb is not included in the voice data, the electronic apparatus 500 may determine whether an adjective is included at operation 617.

In case an adjective is included, at operation 619, the electronic apparatus 500 may determine an apparatus to execute the voice command and the function that the apparatus will perform according to the voice command, based on information regarding the main apparatus (e.g.: the edge apparatus or the thing apparatus) corresponding to the adjective and the action, as information included in the adjective database. Here, in case there is no information corresponding to the adjective in the adjective database, the electronic apparatus 500 may transmit the identified adjective or the voice data acquired at the operation 601 to an external server, and in response thereto, receive information on the apparatus that will execute the voice command and the function that the apparatus will perform according to the voice command.

At operations 615 and 619, when an apparatus that will execute the voice command and the function that the apparatus will perform according to the voice command are determined, the electronic apparatus 500 may determine whether there are a plurality of apparatuses that can execute the voice command at operation 621.

In case it is determined that there are not a plurality of apparatuses that can execute the voice command, at operation 623, the electronic apparatus 500 may control the apparatus that will execute the voice command to execute the function according to the voice command. For example, if the apparatus that will execute the function according to the voice command is identified as the electronic apparatus 500 itself, the electronic apparatus 500 may directly perform the function. As another example, if the apparatus that will execute the function according to the voice command is identified as a third apparatus, the electronic apparatus 500 may transmit information regarding the function according to the voice command to the third apparatus.

In contrast, in case there are a plurality of apparatuses that can execute the voice command, at operation 625, the electronic apparatus 500 may receive user identification for an apparatus that will actually execute the function according to the voice command among the plurality of apparatuses that can execute the voice command. For example, the electronic apparatus 500 may transmit information on the plurality of apparatuses and the functions that the plurality of apparatuses will perform to an external apparatus (e.g.: the dot apparatus or the thing apparatus), the apparatus that the user is using, or an apparatus adjacent to the user. The apparatus that received the information may provide descriptive information on the plurality of apparatuses and the functions that the plurality of apparatuses will perform to the user. For example, the apparatus may provide the descriptive information through the menu on the screen, or provide the descriptive information through a sound. When the user selects an apparatus to execute the voice command with reference to the descriptive information, the apparatus may transmit information on the apparatus that the user selected to the electronic apparatus 500. According to the various embodiments of the disclosure, the electronic apparatus 500 may directly provide the descriptive information on the plurality of apparatuses and the functions that the plurality of apparatuses will perform to the user.

When the user selects at least one apparatus among the plurality of apparatuses based on the descriptive information, the electronic apparatus 500 may control the at least one apparatus selected by the user to execute a voice function according to the voice command, as in the aforementioned operation 623.

When a function according to the voice command is executed at the at least one apparatus, at operation 627, the electronic apparatus 500 or an external apparatus (e.g.: the dot apparatus or the thing apparatus) may provide a voice command feedback indicating that the function according to the voice command has been executed or is being executed to the user. Providing a voice command feedback to a user may include lighting or flickering a light emitting diode (LED), or displaying a notification message on the screen as a visual feedback, or providing a voice or a sound as an auditory feedback.

When the voice command feedback is provided, at operation 629, the electronic apparatus 500 or an external apparatus (e.g.: the dot apparatus or the thing apparatus) may receive input of a user feedback that the user input according to information on the voice command feedback. In case an external apparatus received input of a user feedback, the external apparatus may transmit information on the input user feedback to the electronic apparatus 500.

Based on the information on a user feedback, at operation 631, the electronic apparatus 500 may determine the type of a user feedback. For example, the electronic apparatus 500 may determine whether a user feedback exists or not. In case a user feedback exists, the electronic apparatus 500 may determine whether the user feedback is a positive feedback, or a negative feedback. A positive feedback may be, for example, a voice feedback such as "Good job" and "Thank you." Also, a positive feedback may be, for example, a voice feedback such as "I didn't mean it" and "Please do it again." According to the various embodiments of the disclosure, in case there is no user feedback, the electronic apparatus 500 may assume that the type of a user feedback is a positive feedback.

At operation 633, the electronic apparatus 500 may update a plurality of databases divided according to predicates based on a user feedback. For example, in case a user feedback is a positive feedback, the electronic apparatus 500 may add a weight to information corresponding to the voice command in the database. In contrast, in case a user feedback is a negative feedback, the electronic apparatus 500 may complement or correct information corresponding to the voice command in the database by attenuating a weight, or deleting a weight, or reflecting a second voice command of the user.

At operation 635, the electronic apparatus 500 may share information included in the plurality of updated databases with an external apparatus (e.g.: the edge apparatuses). Also, the electronic apparatus 500 may share information included in the plurality of updated databases with the external server 400. In this case, before sharing the information included in the plurality of updated databases with another external apparatus (e.g.: the edge apparatuses) or the external server 400, the electronic apparatus 500 may request the user's agreement on sharing of the information.

According to the various embodiments of the disclosure, the electronic apparatus 500 may selectively update the plurality of databases based on the type of the predicate included in the user command. For example, in case a predicate included in a voice command was identified as a verb, the electronic apparatus 500 may update the verb database, and in case a predicate included in a voice command was identified as an adjective, the electronic apparatus 500 may update the adjective database.

Figure 7:
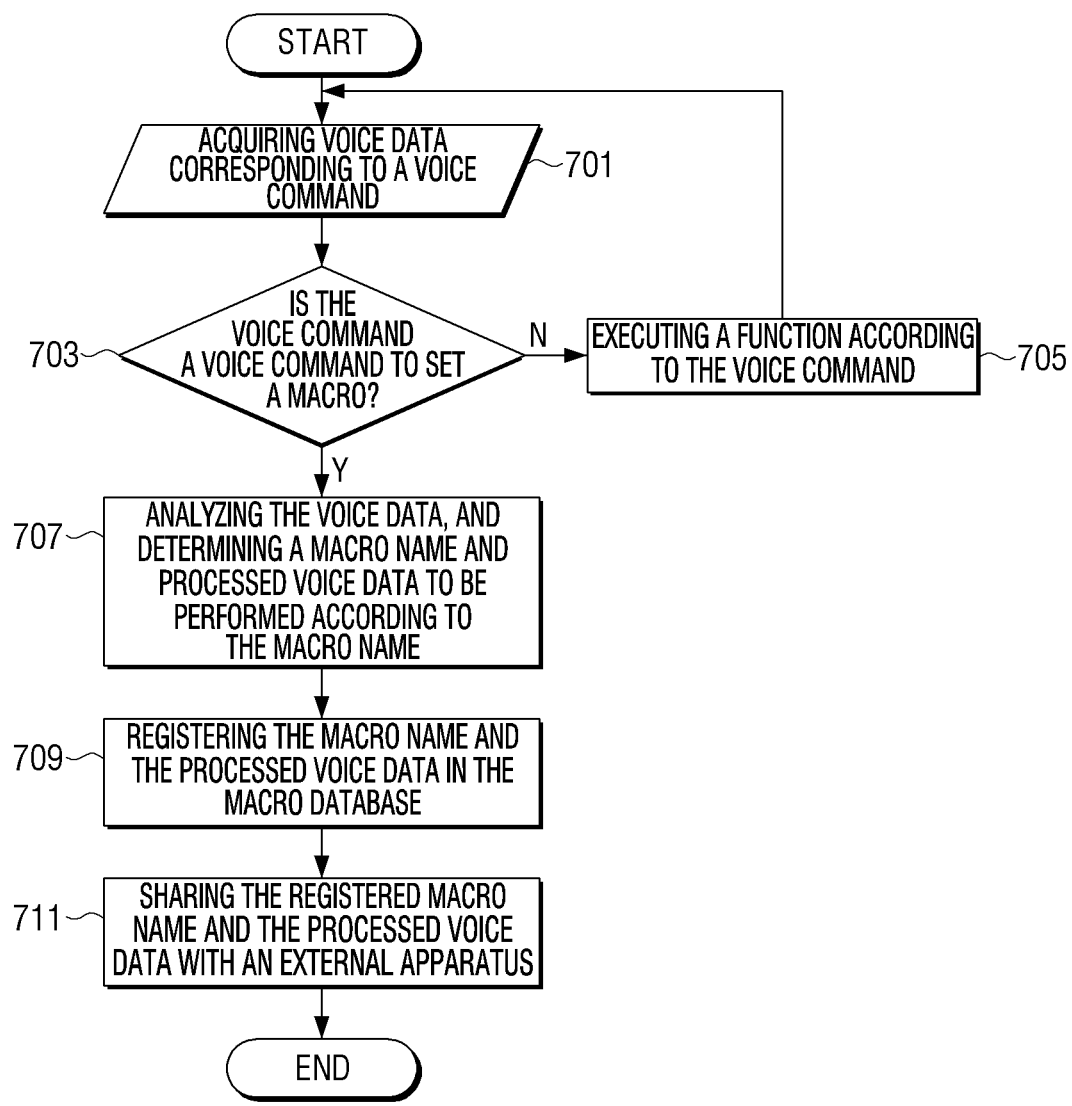
FIG. 7 is a flow chart of an electronic apparatus according to another embodiment of the disclosure.

FIG. 7 is a flow chart of an electronic apparatus according to another embodiment of the disclosure.

Referring to FIG. 7, first, at operation 701, the electronic apparatus may acquire voice data corresponding to a voice command uttered by a user from an external apparatus (e.g.: the dot apparatus).

At operation 703, the electronic apparatus 500 that acquired the voice data may analyze the voice data and determine whether the voice command uttered by the user is a voice command for setting a macro.

In case the voice command is not a voice command for setting a macro, at operation 705, the electronic apparatus 500 may perform control so that a function according to the voice command is executed. As the process related thereto corresponds to the aforementioned operations 605 to 635, overlapping explanation will be omitted.

In case the voice command is a voice command for setting a macro, at operation 707, the electronic apparatus 500 may analyze voice data corresponding to the voice command, and determine a macro name and processed voice data to be performed according to the macro name That is, the electronic apparatus 500 may separate a macro name from the voice data, and determine processed voice data corresponding to the separated macro name.

When a macro name and processed voice data to be performed according to the macro name are determined, at operation 709, the electronic apparatus 500 may register the macro name and the processed voice data in the macro database. Also, at operation 711, the electronic apparatus 500 may share the registered macro name and processed voice data with an external apparatus (e.g.: the edge apparatuses). The other external apparatus may update its own macro database by using the macro name and the processed voice data received from the electronic apparatus 500.

Figure 8:
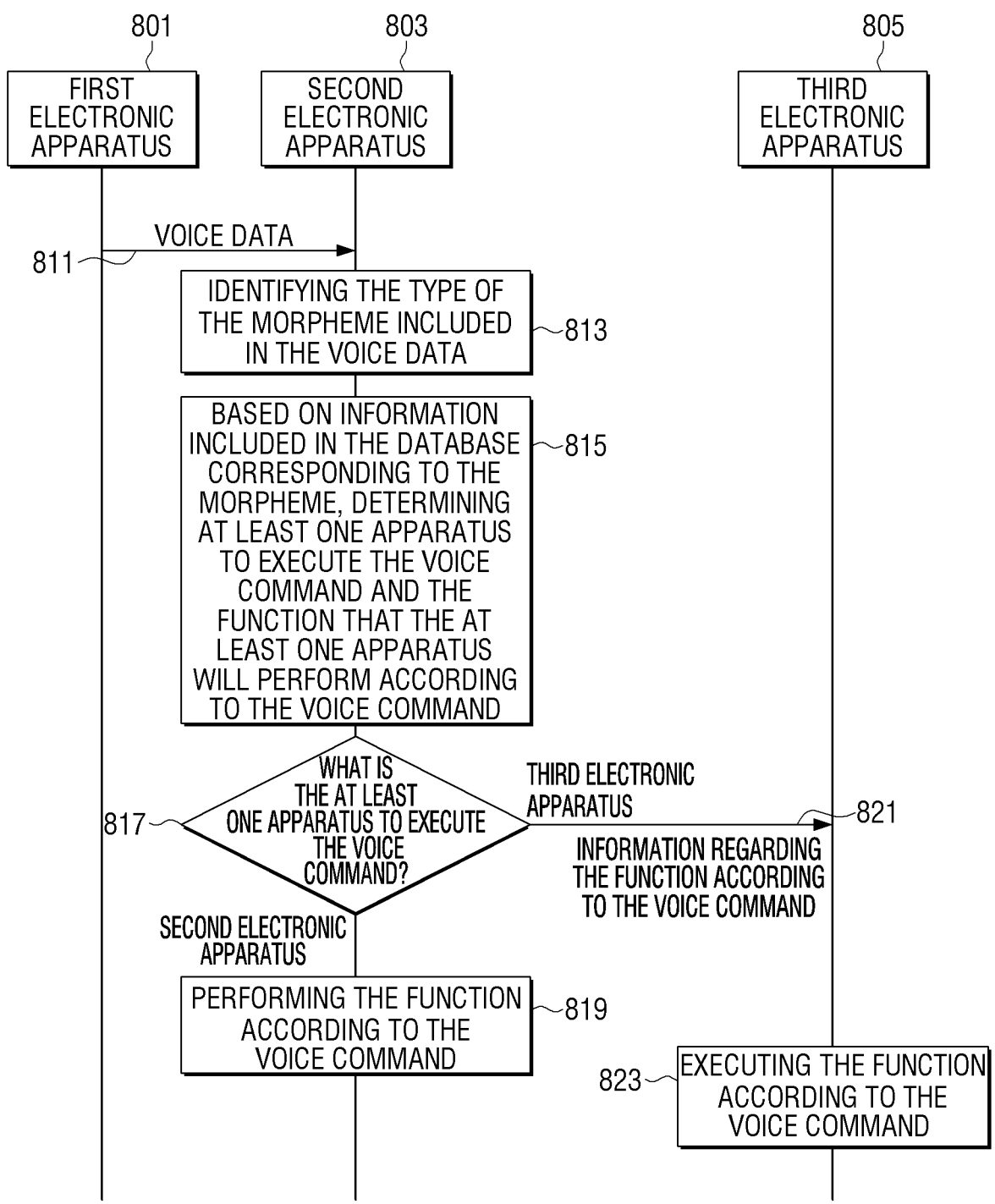
FIG. 8 is a flow chart of a voice recognition system according to an embodiment of the disclosure.

FIG. 8 is a flow chart of a voice recognition system according to an embodiment of the disclosure.

Referring to FIG. 8, the first electronic apparatus 801 may correspond to the voice acquisition apparatus 100 in FIG. 1, the second electronic apparatus 803 may correspond to the voice analysis apparatus 200 in FIG. 1, and the third electronic apparatus 805 may correspond to the voice execution apparatus 300 in FIG. 1.

First, at operation 811, the first electronic apparatus 801 may transmit voice data generated by receiving input of a voice command of a user to the second electronic apparatus 803.

At operation 813, the second electronic apparatus 803 may receive the transmitted voice data, and identify the type of the predicate included in the voice data. When the type of the predicate is identified, the second electronic apparatus 803 may select a database corresponding to the identified predicate among the plurality of databases.

According to the various embodiments of the disclosure, when voice data is received, the second electronic apparatus 803 may identify whether a user's voice command was set as a macro in advance based on the received voice data. In case a user's voice command was set as a macro in advance, the second electronic apparatus 803 may acquire processed voice data corresponding to the preset macro. Then, when the type of the predicate included in the processed voice data is identified, the second electronic apparatus 803 may select a database corresponding to the identified predicate among the plurality of databases.

At operation 815, the second electronic apparatus 803 may determine at least one apparatus to execute a voice command and a function that the at least one apparatus will perform according to the voice command, based on information included in the database corresponding to the predicate.

At operation 817, the second electronic apparatus 803 may determine at least one apparatus to execute the voice command Here, in case there are a plurality of apparatuses to execute the voice command, the second electronic apparatus 803 may request a user identification for an apparatus that will actually execute the function according to the voice command among the plurality of apparatuses.

In case the at least one apparatus that will execute the voice command is the second electronic apparatus 803 itself, at operation 819, the second electronic apparatus 803 may execute the function according to the voice command.

In contrast, in case the at least one apparatus that will execute the voice command is the third electronic apparatus 805, at operation 821, the second electronic apparatus 803 may transmit information regarding the function according to the voice command to the third electronic apparatus 805.

At operation 823, the third electronic apparatus 805 may execute the function according to the voice command, based on the transmitted information regarding the function.

When the function according to the voice command is executed, the second electronic apparatus 803 may acquire information on a user feedback for the function according to the voice command. Then, the second electronic apparatus 803 may update the plurality of databases divided according to predicates, based on the information on the user feedback.

Figure 9:
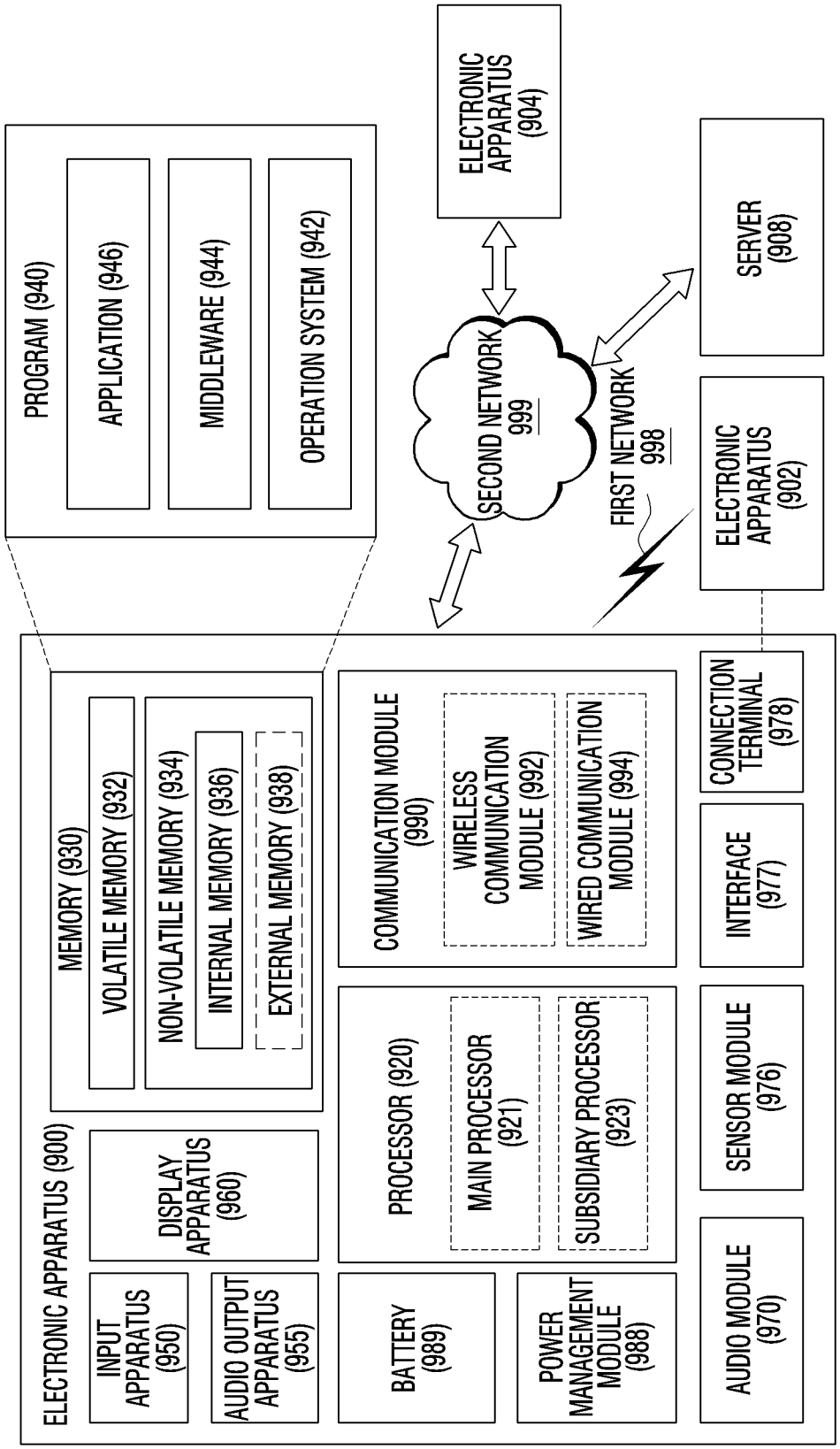
FIG. 9 is a block diagram of an electronic apparatus in a network environment according to an embodiment of the disclosure.

FIG. 9 is a block diagram of an electronic apparatus 900 in a network environment according to an embodiment of the disclosure. The electronic apparatus 900 may be an example of the aforementioned electronic apparatus 500 in FIG. 2.

Referring to FIG. 9, in a network environment, the electronic apparatus 900 may communicate with an electronic apparatus 902 through a first network 998 (e.g.: a near field wireless communication network), or communicate with an electronic apparatus 904 or a server 908 (e.g., the external server 400 in FIG. 1) through a second network 999 (e.g.: a long distance wireless communication network). According to an embodiment of the disclosure, the electronic apparatus 900 may communicate with the electronic apparatus 904 through the server 908. Meanwhile, according to an embodiment of the disclosure, the electronic apparatus 900 may include a processor 920, a memory 930, an input apparatus 950, an audio output apparatus 955, a display apparatus 960, an audio module 970, a sensor module 976, an interface 977, a power management module 988, a battery 989, and a communication module 990. In some embodiments, in the electronic apparatus 900, at least one of these components (e.g.: the display apparatus 960) may be omitted, or at least one other component may be added. Also, in some embodiments, some of these components may be implemented as one integrated circuit. For example, the sensor module 976 (e.g.: a fingerprint sensor, an iris sensor, or an illuminance sensor) may be implemented while being embedded in the display apparatus 960 (e.g.: the display).

The processor 920 may, for example, execute software (e.g.: the program 940) and control at least one other component (e.g.: a hardware or software component) of the electronic apparatus 900 connected with the processor 920, and perform various kinds of data processing or operations. According to an embodiment of the disclosure, as at least a part of data processing or an operation, the processor 920 may load an instruction or data received from another component (e.g.: the sensor module 976 or the communication module 990) on the volatile memory 932, process the instruction or data stored in the volatile memory 932, and store the result data in the non-volatile memory 934. Also, according to an embodiment of the disclosure, the processor 920 may include a main processor 921 (e.g.: a main processing apparatus or an application processor), and a subsidiary processor 923 that can be operated independently therefrom or together (e.g.: a graphic processing apparatus, an image signal processor, a sensor hub processor, or a communication processor). Additionally or alternatively, the subsidiary processor 923 may be set to use lower power than the main processor 921, or to be specified for a designated function. Also, the subsidiary processor 923 may be implemented separately from the main processor 921, or as a part thereof.

The subsidiary processor 923 may, for example, control at least some of functions or states related to at least one component (e.g.: the display apparatus 960, the sensor module 976, or the communication module 990) among the components of the electronic apparatus 900, instead of the main processor 921 while the main processor 921 is in an inactive (e.g.: sleep) slate, or together with the main processor 921 while the main processor 921 is in an active (e.g.: executing an application) state. According to an embodiment of the disclosure, the subsidiary processor 923 (e.g.: an image signal processor or a communication processor) may be implemented as a part of another component or the communication module 990 that is functionally related.

The memory 930 may store various kinds of data used by at least one component (e.g.: the processor 920 or the sensor module 976) of the electronic apparatus 900. The data may include, for example, software (e.g.: the program 940) and input data or output data regarding an instruction related thereto. Also, the memory 930 may include a volatile memory 932 or a non-volatile memory 934, and internal memory 936 and external memory 938.

The program 940 may be stored as software in the memory 930, and may include, for example, an operation system 942, middleware 944, or an application 946.

The input apparatus 950 may receive instructions or data to be used for the components (e.g.: the processor 920) of the electronic apparatus 900 from the outside (e.g.: a user) of the electronic apparatus 900. Also, the input apparatus 950 may include, for example, a microphone, a mouse, a keyboard, or a digital pen (e.g.: a stylus pen).

The audio output apparatus 955 may output an audio signal to the outside of the electronic apparatus 900. The audio output apparatus 955 may include, for example, a speaker or a receiver. A speaker may be used as a general use such as reproduction of multimedia or reproduction of recording, and a receiver may be used for receiving an incoming call. According to an embodiment of the disclosure, a receiver may be implemented separately from a speaker, or as a part thereof.

The display apparatus 960 may visually provide information to the outside (e.g.: a user) of the electronic apparatus 900. The display apparatus 960 may include, for example, a display, a hologram apparatus, or a projector and a control circuit for controlling the apparatus. According to an embodiment of the disclosure, the display apparatus 960 may include touch circuitry set to detect a touch, or sensor circuitry (e.g.: a pressure sensor) set to measure the strength of power generated by the touch.

The audio module 970 may convert a sound to an electronic signal, or convert an electronic signal to a sound, vice versa. According to an embodiment of the disclosure, the audio module 970 may acquire a sound through the input apparatus 950, or output a sound through the audio output apparatus 955, or an external electronic apparatus (e.g.: the electronic apparatus 102 (e.g.: a speaker or a headphone)) connected with the electronic apparatus 900 directly or wirelessly.

The sensor module 976 may detect an operational state (e.g.: the power or the temperature) of the electronic apparatus 900, or the external environmental state (e.g.: the user's state), and generate an electronic signal or a data value corresponding to the detected state. According to an embodiment of the disclosure, the sensor module 976 may include, for example, a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more designated protocols that can be used for the electronic apparatus 900 to be connected with an external electronic apparatus (e.g.: the electronic apparatus 902) directly or wirelessly. According to an embodiment of the disclosure, the interface 977 may include, for example, a high definition multimedia interface (HDMI), a universal serial bus (USB) interface, a secure digital (SD) card interface, or an audio interface.

The connection terminal 978 may include a connector through which the electronic apparatus can be physically connected with an external electronic apparatus (e.g.: the electronic apparatus 902). According to an embodiment of the disclosure, the connection terminal 978 may include, for example, an HDMI connector, a USB connector, an SD card connector, or an audio connector (e.g.: a headphone connector).

The power management module 988 may manage power supplied to the electronic apparatus 900. According to an embodiment of the disclosure, the power management module 988 may be implemented, for example, as at least a part of a power management integrated circuit (PMIC).

The battery 989 may supply power to at least one component of the electronic apparatus 900. According to an embodiment of the disclosure, the battery 989 may include, for example, a primary battery that cannot be recharged, or a secondary battery or a fuel cell that can be recharged.

The communication module 990 may support establishment of a direct (e.g.: wired) communication channel or a wireless communication channel between the electronic apparatus 900 and an external electronic apparatus (e.g.: the electronic apparatus 902, the electronic apparatus 904, or the server 908), and performance of communication through the established communication channel. The communication module 990 may include at least one communication processor that is operated independently from the processor 920 (e.g.: an application processor), and supports direct (e.g.: wired) communication or wireless communication. According to an embodiment of the disclosure, the communication module 990 may include a wireless communication module 992 (e.g.: a cellular communication module, a near field wireless communication module, or a global navigation satellite system (GNSS) communication module) or a wired communication module 994 (e.g.: a local area network (LAN) communication module, or a power line communication module). Among these communication modules, a corresponding communication module may communicate with an external electronic apparatus through the first network 998 (e.g.: a near field communication network like Bluetooth, Wi-Fi direct or infrared data association (IrDA)) or the second network 999 (e.g.: a long distance communication network like a cellular network, the Internet, or a computer network (e.g.: a LAN or a WAN)). Such several kinds of communication modules may be integrated as one component (e.g.: a single chip), or implemented as a plurality of separate components (e.g.: a plurality of chips).

At least some of the above components may be connected with one another through communication methods among adjacent apparatuses (e.g.: a bus, a general purpose input and output (GPIO), a serial peripheral interface (SPI), or a mobile industry processor interface (MIPI)), and exchange signals (e.g.: instructions or data) with one another.

According to an embodiment of the disclosure, instructions or data may be transmitted or received between the electronic apparatus 900 and an external electronic apparatus 904 through the server 908 connected with the second network 999. Each of the electronic apparatuses 902, 904 may be an apparatus of a type that is identical to or different from the electronic apparatus 900. According to an embodiment of the disclosure, all or some of the operations executed at the electronic apparatus 900 may be executed in one or more external apparatuses among the external electronic apparatuses 902, 904, or 908. For example, in case the electronic apparatus 900 needs to perform a function or a service automatically, or in response to a request from a user or another apparatus, the electronic apparatus 900 may request one or more external electronic apparatuses to perform at least a part of the function or the service instead of executing the function or the service by itself, or in addition to it. The one or more external electronic apparatuses that received the request may execute at least a part of the requested function or service, or an additional function or service related to the request, and transmit the result of execution to the electronic apparatus 900. The electronic apparatus 900 may process the result as it is or additionally, and provide the result as at least a part of a response to the request. For this, a cloud computing technology, a distributive computing technology, or a client-server computing technology may be used, for example.

The term "module" used in the disclosure may include a unit implemented as hardware, software, or firmware, and it may be interchangeably used with terms, for example, logic, a logical block, a component, or a circuit. Also, a module may be a component consisting of an integrated body or a minimum unit of the component performing one or more functions or a portion thereof. For example, according to an embodiment of the disclosure, a module may be implemented in the form of an application-specific integrated circuit (ASIC).

The various embodiments of the disclosure may be implemented as software (e.g.: the program 940) including one or more instructions stored in a storage medium (e.g.: the memory 930, 530) that is readable by machines (e.g.: the electronic apparatus 900, 500). For example, the processor (e.g.: the processor 920, 520) of a machine (e.g.: the electronic apparatus 900) may call at least one instruction among one or more instructions stored in a storage medium, and execute the instruction. This makes it possible that a machine is operated to perform at least one function according to the at least one called instruction. The one or more instructions may include a code generated by a compiler or a code that can be executed by an interpreter. A storage medium that is readable by machines may be provided in the form of a non-transitory storage medium. Here, the term 'non-transitory' only means that a storage medium is a tangible apparatus, and does not include signals (e.g.: electromagnetic waves), and the term does not distinguish a case wherein data is stored in the storage medium semi-permanently and a case wherein data is stored in the storage medium temporarily.

According to an embodiment of the disclosure, a storage medium that is readable by machines may include at least one instruction that is set such that, when the electronic apparatus 900, 500 is executed, the processor (e.g.: the processor 920, 520) identifies the type of the predicate included in voice data, and determines at least one apparatus that will execute the voice command and the function that the at least one apparatus will perform according to the voice command, based on information included in a database corresponding to the identified predicate, and controls the at least one apparatus to execute the function according to the voice command.

Also, according to an embodiment of the disclosure, the method according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line (e.g.: download or upload) through an application store (e.g.: Play Store™), or directly between two user apparatuses (e.g.: smartphones). In the case of on-line distribution, at least a portion of a computer program product may be stored in a storage medium that is readable by machines such as the server of the manufacturer, the server of the application store, and the memory of the relay server at least temporarily, or may be generated temporarily.

In addition, according to an embodiment of the disclosure, each component (e.g.: a module or a program) of the aforementioned components may consist of a singular object or a plurality of objects. Also, according to an embodiment of the disclosure, among the aforementioned corresponding components, one or more components or operations may be omitted, or one or more other components or operations may be added. Generally or additionally, a plurality of components (e.g.: modules or programs) may be integrated as one component. In this case, the integrated component may perform one or more functions of each of the plurality of components identically or in a similar manner to how they were performed by the corresponding component among the plurality of components before integration. Further, according to an embodiment of the disclosure, operations performed by a module, a program, or other components may be executed sequentially, in parallel, repetitively, or heuristically. Or, at least one of the operations may be executed in a different order or omitted, or one or more operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a memory including a plurality of databases divided according to predicates;
   a communication circuit configured to receive voice data corresponding to a voice command of a user from an external apparatus; and
   a processor operatively connected with the memory and the communication circuit,
   wherein the processor is configured to:
   identify a type of a predicate included in the voice data,
   based on information included in a database corresponding to the identified type of the predicate, determine at least one apparatus to execute the voice command and a function that the at least one apparatus will perform according to the voice command,
   control the at least one apparatus to execute the function according to the voice command,
   provide a voice command feedback indicating that the function according to the voice command has been executed or is being executed to the user,
   obtain a user feedback in response to the voice command feedback,
   determine a type of the user feedback,
   update the plurality of databases by adjusting a weight of information corresponding to the voice command based on the type of the user feedback,
   add the weight to the information corresponding to the voice command in response to determining that the type of the user feedback is positive, and attenuate the weight of the information corresponding to the voice command in response to determining that the type of the user feedback is negative.

2. The electronic apparatus of claim 1, wherein the processor is further configured to:
in case of controlling to execute the function according to the voice command, based on information included in the database, according to the at least one apparatus being determined as the electronic apparatus itself, execute the function according to the voice command.

3. The electronic apparatus of claim 1, wherein the processor is further configured to:
in case of controlling to execute the function according to the voice command, based on information included in the database, according to the at least one apparatus being determined as a third apparatus, control the communication circuit to transmit information regarding the function according to the voice command to the third apparatus.

4. The electronic apparatus of claim 1, wherein the processor is further configured to:
select a database corresponding to the identified type of the predicate among the plurality of databases.

5. The electronic apparatus of claim 1, wherein, in case there are a plurality of apparatuses to execute the voice command, the processor is further configured to request user selection of at least one apparatus to execute the function according to the voice command among the plurality of apparatuses.

6. The electronic apparatus of claim 5, wherein the processor is further configured to:
control the communication circuit to transmit information regarding the plurality of apparatuses and functions that the plurality of apparatuses will perform to the external apparatus, and
control the communication circuit to receive information regarding the selected at least one apparatus among the plurality of apparatuses from the external apparatus.

7. The electronic apparatus of claim 1, wherein the processor is further configured to:
in case information corresponding to the predicate does not exist in the plurality of databases, control the communication circuit to transmit the predicate to an external server, and
control the communication circuit to receive information corresponding to the predicate from the external server.

8. The electronic apparatus of claim 1, wherein the processor is further configured to:
identify whether the voice command was preset as a macro in advance, and
in case the voice command was set as a macro in advance, acquire processed voice data corresponding to the preset macro.

9. The electronic apparatus of claim 1, wherein the plurality of databases include a verb database and an adjective database.

10. The electronic apparatus of claim 1,
wherein, in case the plurality of databases include a verb database, information included in the verb database includes at least one of a user's request corresponding to a verb, a main apparatus corresponding to the verb, or a subject of an action corresponding to the verb.

11. The electronic apparatus of claim 1,
wherein, in case the plurality of databases include an adjective database, information included in the adjective database includes at least one of a user's request corresponding to an adjective, a supportable voice analysis apparatus corresponding to the adjective, a supportable voice execution apparatus corresponding to the adjective, or an action corresponding to the adjective.

12. A method of controlling an electronic apparatus, the method comprising:
receiving voice data corresponding to a voice command of a user;
identifying a type of a predicate included in the voice data;
based on information included in a database corresponding to the identified type of the predicate, determining at least one apparatus to execute the voice command and a function that the at least one apparatus will perform according to the voice command;
controlling the at least one apparatus to execute the function according to the voice command;
providing a voice command feedback indicating that the function according to the voice command has been executed or is being executed to the user;
obtaining a user feedback in response to the voice command feedback;
determining a type of the user feedback; and
updating the database by adjusting a weight of information corresponding to the voice command based on the type of the user feedback,
wherein the adjusting of the weight of the information corresponding to the voice command comprises:
adding the weight to the information corresponding to the voice command in response to determining that the type of the user feedback is positive, and
attenuating the weight of the information corresponding to the voice command in response to determining that the type of the user feedback is negative.

13. The method of claim 12, wherein the controlling to execute the function according to the voice command comprises:
based on information included in the database, according to the at least one apparatus being identified as the electronic apparatus itself, executing the function according to the voice command.

14. The method of claim 12, wherein the controlling to execute the function according to the voice command comprises:
based on information included in the database, according to the at least one apparatus being identified as a third apparatus, transmitting information regarding the function according to the voice command to the third apparatus.

15. The method of claim 12, further comprising:
selecting a database corresponding to the identified type of the predicate among a plurality of databases.

16. The method of claim 12, further comprising:
in case there are a plurality of apparatuses to execute the voice command, requesting user identification for an apparatus that will actually execute the function according to the voice command among the plurality of apparatuses.

17. The method of claim 12, further comprising:
identifying whether the voice command was preset as a macro in advance; and
in case the voice command was set as a macro in advance, acquiring processed voice data corresponding to the preset macro.

18. The method of claim 12,
wherein a plurality of databases include a verb database and an adjective database, wherein information included in the verb database includes at least one of a user's request corresponding to a verb, a main apparatus corresponding to the verb, or a subject of an action corresponding to the verb, and wherein information included in the adjective database includes at least one of a user's request corresponding to an adjective, a supportable voice analysis apparatus corresponding to the adjective, a supportable voice execution apparatus corresponding to the adjective, or an action corresponding to the adjective.

* * * * *